Oct. 11, 1966 W. RUTKOFSKY 3,277,591

DECORATOR STYLE SELECTION CHART DEVICE

Filed March 17, 1964 4 Sheets-Sheet 1

INVENTOR.
William Rutkofsky
BY Polachek & Saulsbury
ATTORNEYS

Oct. 11, 1966 W. RUTKOFSKY 3,277,591

DECORATOR STYLE SELECTION CHART DEVICE

Filed March 17, 1964

4 Sheets-Sheet 2

INVENTOR.

William Rutkofsky

BY Polachek & Saulsbury

ATTORNEYS

Oct. 11, 1966 W. RUTKOFSKY 3,277,591

DECORATOR STYLE SELECTION CHART DEVICE

Filed March 17, 1964 4 Sheets-Sheet 3

INVENTOR.
William Rutkofsky
BY Polachek & Saulsbury
ATTORNEYS

INVENTOR
William Rutkofsky
BY Polachek & Saulsbury
ATTORNEYS

United States Patent Office 3,277,591
Patented Oct. 11, 1966

3,277,591
DECORATOR STYLE SELECTION CHART DEVICE

William Rutkofsky, 245 W. 25th St., New York, N.Y.
Filed Mar. 17, 1964, Ser. No. 352,525
10 Claims. (Cl. 35—74)

This invention relates to a decorator style selection chart device which provides selective coordinated decoration data relating to particular styles of furniture, woods, floor covering, fabrics, accessories, and color guides.

According to the invention, the device includes a central flat disk on opposite sides of which are circular charts, each including a plurality of groups of data in radial arrangement. Juxtaposed to the disk on opposite sides thereof are two rotatable circular selection disks or masks. The masks are concentric with the charts. The masks have radially arranged windows through which all the data on the charts relating to any particular period or style of furniture may be viewed. The masks are rotatably secured at their centers to the center of the central disk and are rotatable on the charts on opposite sides of the central disk. The device can be arranged in the form of a book or portfolio on the covers of which may appear descriptive data relating to furniture, its construction, care and selection. The central disk of the device can be provided with a plurality of apertures in which tabs can be removably and interchangeably inserted for providing data relating to different types of furniture.

It is therefore one object of the invention to provide a decorator style selection device, including a central disk having circular charts on opposite sides, with masks rotatably mounted on the opposite sides of the disk.

A further object is to provide a decorator style selection device as described in which the disk forms a leaf of a book having covers for protecting the disk and the rotatable masks on the disk.

Another object is to provide a decorator style selection device as described, wherein the central disk has radially arranged apertures for removably and interchangeably receiving tabs bearing various data relating to a particular style and period of furniture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 6 is a plan view of another device embodying the invention, parts of an upper mask being broken away.

FIG. 7 is an enlarged cross-sectional view taken on line 7—7 of FIG. 6.

Figures 1, 4, 5:
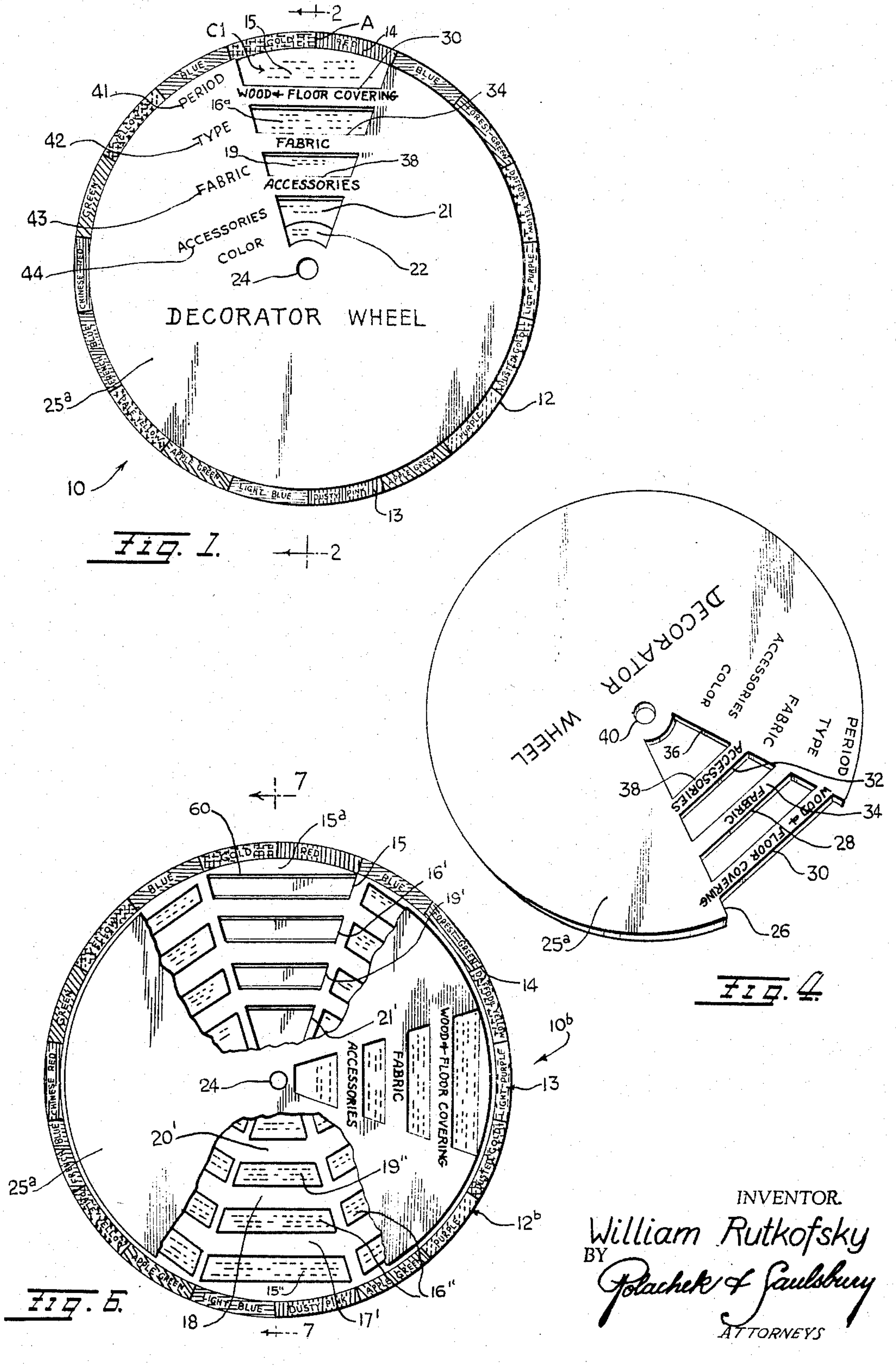
FIG. 1 is a plan view of a decorator style device embodying the invention.
FIG. 4 is a perspective view of a data selection mask.
FIG. 5 is a perspective view of the device.
Figure 2:
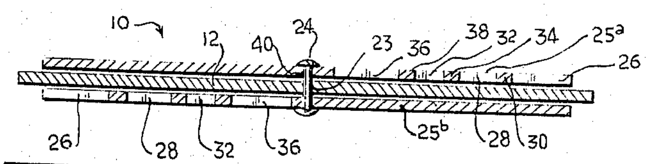
FIG. 2 is an enlarged cross-sectional view taken on line 2—2 of FIG. 1.
Figure 3A:
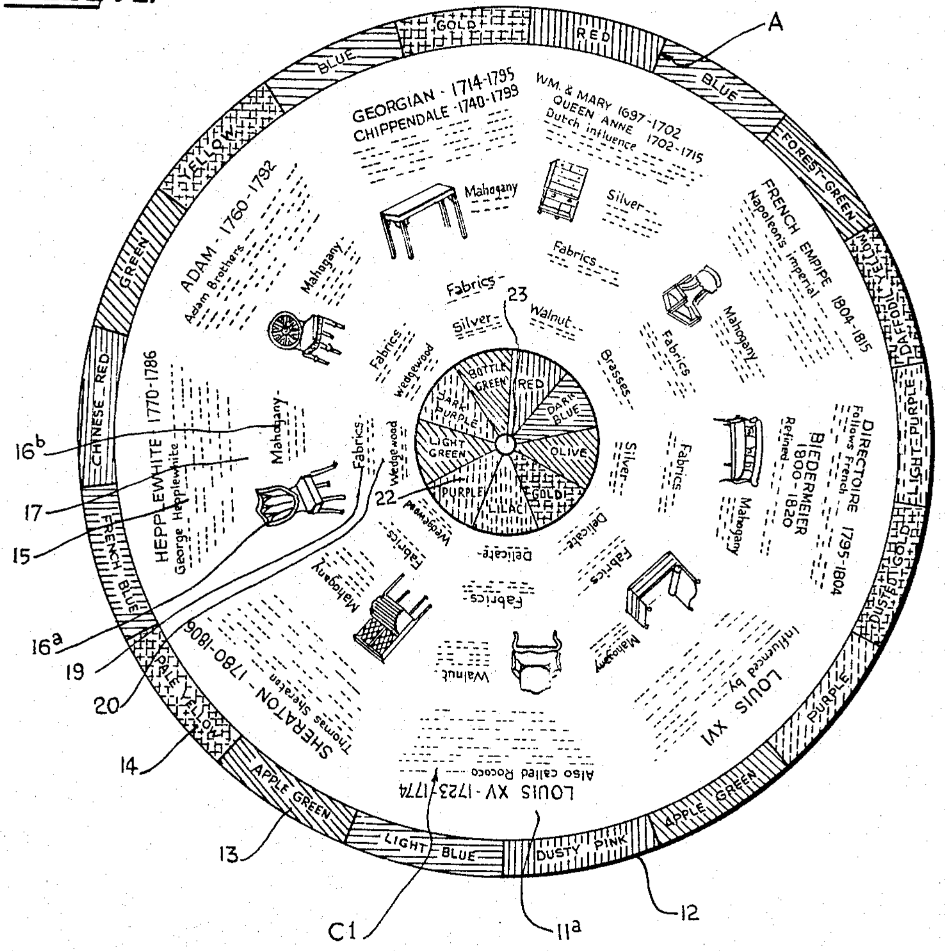
FIGS. 3A and 3B are plan views on a further enlarged scale of opposite sides of the central disk of FIGS. 1 and 2.
Figure 3B:
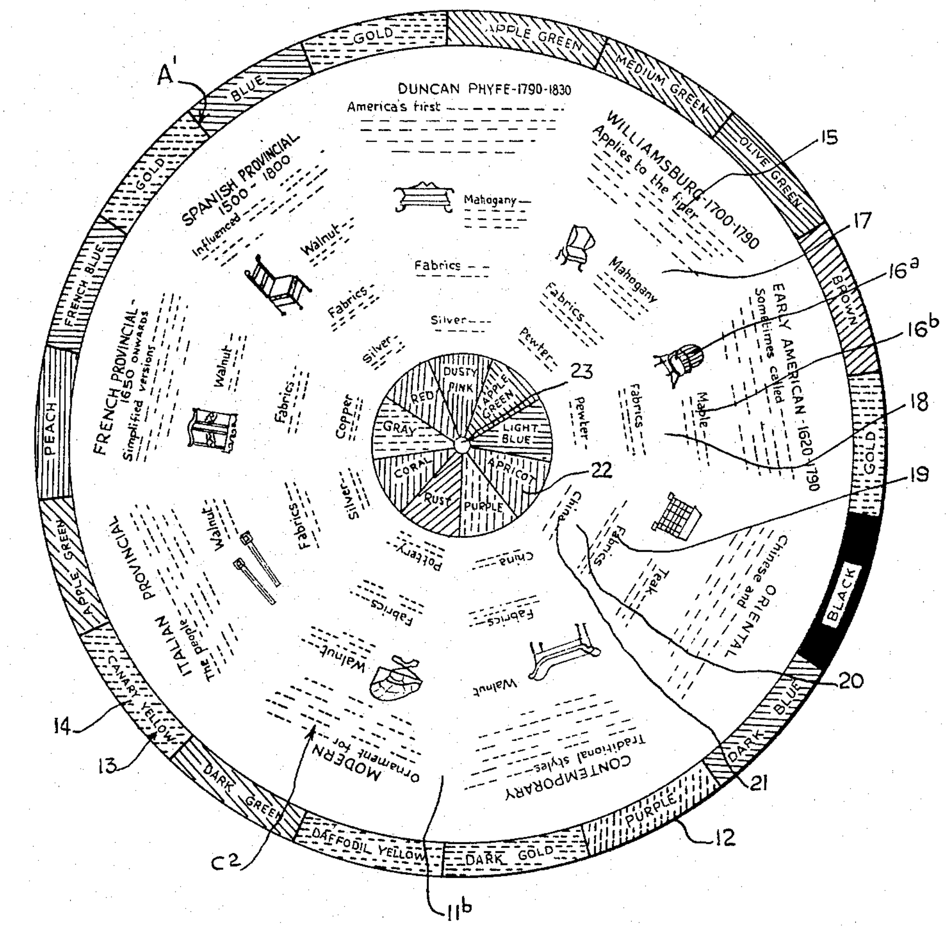

Referring first to FIGS. 1–4, there is shown the device 10 including a flat circular disk 12 made of metal, plastic, wood, cardboard or other suitable rigid sheet material. On the opposite sides 11*a*, 11*b*, as shown best in FIGS. 3A and 3B, are charts C1, C2. Each of these charts has an outer annular or circular band 13 divided into arcuate colored stripes or ribbons 14. Eighteen ribbons 14 are shown provided on each side of the circular disk 12. Each ribbon occupies about 20° of arc circumferentially of the band. Adjacent to the band 12 are trapezoidal sections 15 containing data relating to different styles or periods of furniture. Each trapezoidal section extends circumferentially about 40° so that two differently colored ribbons are coextensive with each trapezoidal section. There are nine trapezoidal sections 15 disposed circumferentially around each chart radially inward of each band 12. Radially inward of each trapezoidal section 15 and spaced by a blank section 17 are two generally rectangular sections 16*a*, 16*b*. Section 16*a* contains an illustration of a period or style of furniture corresponding to the description in section 15. Section 16*b* contains data relating to different types of wood floor covering or other materials characteristic of the particular furniture style illustrated in section 16*a* and described in section 15. Radially inward of sections 16*a*, 16*b* and spaced by a blank section 18 is a section 19 containing data relating to fabrics characteristic of the furniture style described in section 15.

Radially inward of section 19 and spaced by a blank section 20 is a narrow section 21 containing data relating to accessories used with furniture of the period and style described in the radially aligned sections 15, 16*a*, 16*b*. Adjacent to each narrow section 21 is a colored trapezoidal section 22 which terminates at its narrow end near a hole 23. The color of section 22 coordinates with the colors of the two ribbons 14 adjacent to the section 15 radially aligned with section 22. Sections 19, 21 and 22 each occupy about 40° circumferentially of the chart on the disk. Sections 16*a* and 16*b* each occupy about 20° so that together they occupy about 40°. It will thus be apparent that each chart is divided into nine generally triangular sectors, each of which has a plurality of radially spaced trapezoidal sections containing coordinated and related data concerning a furniture style, color schemes, illustration of the furniture style, fabric data, material data, etc.

At the center of the disk is hole 23 which receives a rivet or eyelet 24. The eyelet rotatably engages rotatable circular masks 25*a*, 25*b* on opposite sides of the disk. The diameter of each mask is equal to the diameter of the chart C1 or C2 just inside of band 12. Each mask, as clearly shown in FIGS. 1, 2 and 4, has an outer trapezoidal cutout or window 26. This window extends circumferentially about 40° so as to expose any one of the trapezoidal sections 15 to which the mask may be turned on the disk. A second trapezoidal aperture or window 28 is spaced by a narrow strip 30 radially inward of window 26. Window 28 exposes both sections 16*a* and 16*b* when associated section 15 is exposed at window 26. Strip 30 then overlays blank 17. A third trapezoidal aperture or window 32 is spaced by a narrow strip 34 radially inward of window 28 to expose section 19 when window 26 registers with and exposes a section 15. Strip 34 then overlays blank 18. A fourth trapezoidal aperture or window 36 is spaced by a narrow strip 38 radially inward of window 32 and exposes sections 21 and 22 simultaneously. Strip 38 then overlays blank 20. A central hole 40 in each mask receives rivet 24 so that each mask is concentric with the chart C1 or C2 with which it is associated. The circular band 12 is exposed just outside the periphery of each mask 25*a* and 25*b*.

On each mask are legends 41–44 adjacent to the windows respectively indicating the general subject matter to be viewed on the exposed sections of the charts on the disk. The charts C1 and C2 are coordinated in location on opposite sides of the disk. Radial line A in band 12 located at the center of the "William & Mary-Queene Anne" sector on chart C1 registers with radial line A′ at the center of the "Spanish Provincial" section on chart C2. Masks 25*a*, 25*b* are made of metal, plastic, wood, cardboard or other suitable sheet material.

In using the device 10, the mask 25*a* or 25*b* will be rotated around the disk 12 until a section 15 relating to a selected type or period of furniture appears in the cutout or window 26. The data of sections 16*a*, 16*b* relating to the material of the furniture and its characteristic appearance appears at window 28. The data of section 19 relating to fabrics appears at window 32. The data relating to accessories and color schemes thereof on sections 21, 22 appears at window 36. The decorator, dealer, client, homemaker, student or whoever is using the device is thus provided in a convenient, concentrated form, the essential information relating to the selected style or type of furniture, accessories, fabrics, room color schemes, etc.

FIG. 5 shows another device 10*a* which is identical to device 10 except that disk 12*a* is outlined by a scored, circular line of slits 48 on a rectangular sheet 50. The entire device can be separated from the sheet 50 by tearing the sheet at the scored line. Alternatively, the device can be left in place and used in association with rectangular cover 52. The cover is folded at the center and serves as a protective folio for the device 10*a*. On the cover may be provided further data 55 relating to various matters concerning furniture selection, room planning, etc. Other parts of device 10*a* are identical to device 10 and the description above of device 10 will suffice for device 10*a*. Parts of device 10*a* corresponding to those of device 10 are identically numbered.

FIGS. 6 and 7 show another furniture selection chart device 10*b* in which parts corresponding to those of chart 10 are identically numbered. Circular masks 25*a* and 25*b* are the same as in mask device 10. Central disk 12*b* has a plurality of groups of radially arranged trapezoidal apertures 15′, 16′, 19′ and 21′. These apertures correspond respectively in location to the sections 15, 16*a*, 16*b* 19 and 21–22. The apertures are die-cut so that opposite circumferential edges 60 are wedge-shaped or beveled in cross section as clearly shown in FIG. 2. On these beveled edges engage grooves 62 formed at opposite parallel edges of trapezoidal tabs 15″, 16″, 19″ and 21″ respectively shown in FIGS. 6 and 7. Strips 17′, 18′, 20′ corresponding to blanks 17, 18 and 20 separate the apertures. The tab 21″ includes the accessory and color areas 21 and 22.

Figure 8A:
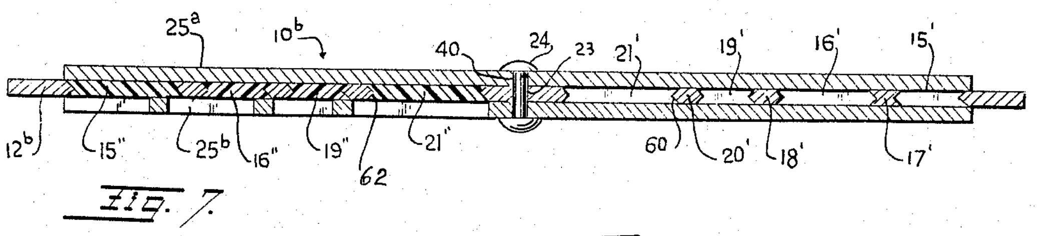
FIGS. 8A, 8B and 8C are plan views of sets of data areas which may be employed in the device of FIGS. 6 and 7.
Figure 8B:
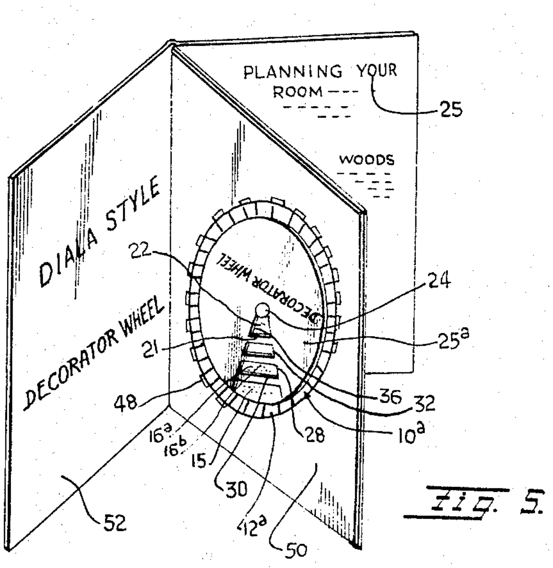
Figure 8C:
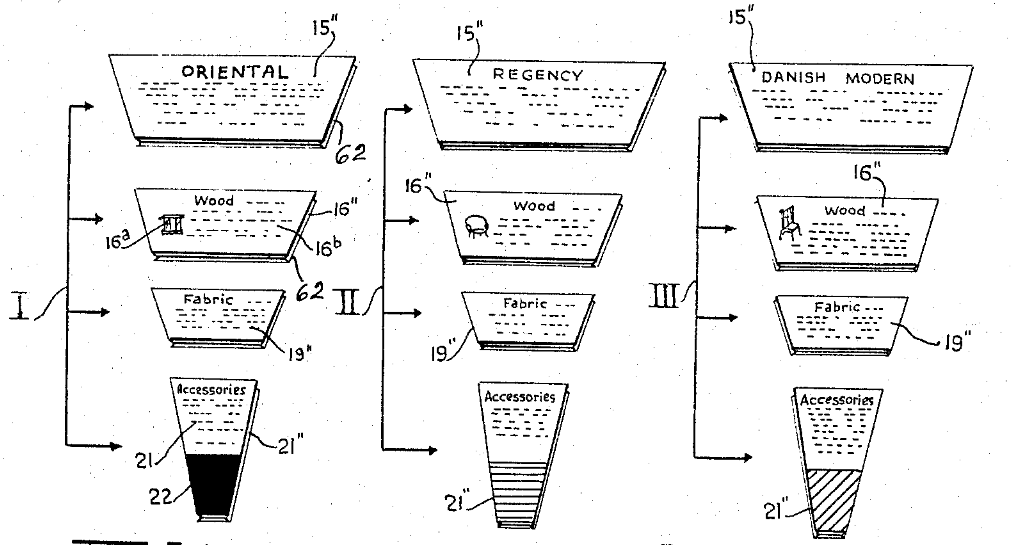

FIGS. 8A, 8B and 8C show three different coordinated groups I, II and III of such tabs. Each tab 15″ carries data relating to a different type or period of furniture such as "Oriental," "Regency," "Danish Modern," etc. The tabs will be provided as a group for insertion in the apertures in disk 12*b*. The disk 12*b* can be provided with nine groups of trapezoidal apertures corresponding in location and size to the trapezoidal sections on charts C1 and C2. All the data imprinted in sections 15, 16*a*, 16*b*, 19, 21, 22 of charts C1, C2 may then be imprinted on opposite sides of the respective tabs. Thus each group of tabs will cover the related, coordinated data of one or two different types and styles of furniture. The interchangeable and replaceable arrangement of the tabs in device 10*b* increases the versatility and usefulness of the device.

It will be found that the tabs can easily be snapped into place and out of engagement with the beveled edges of the apertures since these beveled edges are formed at the edges of the narrow flexible strips 17′, 18′, 20′. The strips flex slightly to permit the tabs to be snapped on and off the disk. Another strip 15*a* is provided at the outer edge of aperture 15′. If desired, the device 10*b* can be made as part of a book or portfolio in the same manner as illustrated in FIG. 5.

In all forms of the invention, there is provided a lightweight, relatively inexpensive, convenient furniture coordination and selection device for use wherever arise decoration problems concerning furniture and related decoration matters. The device may be imprinted with advertising data and used for advertising purposes by dealers, decorators and others in the trade. It may also be used by students, teachers, salesmen as a teaching device and by home makers for general information.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A device for coordinating furniture styles with color schemes, fabrics, accessories and related data, comprising a flat circular disk, each side of said disk having an annular peripheral band divided into arcuate differently colored ribbons, a first trapezoidal section located radially inward of each adjacent pair of said ribbons for bearing data relating to a particular furniture style and period, a second trapezoidal section located radially inward of the first section for bearing pictorial data and material composition data relating to said furniture style and period, a third trapezoidal section located radially inward of the second section bearing data relating to fabrics characteristic of said furniture style and period, a fourth trapezoidal section located radially inward of said third section and terminating near the center of said disk, said fourth section bearing data related to accessories characteristic of said furniture style and period, part of said fourth section being colored to coordinate with the colors of said pair of ribbons to indicate a room color scheme appropriate to said furniture style and period; a pair of circular masks mounted on opposite sides of said disk concentric therewith, pivot means rotatably securing the masks to the disk at the registering centers of the masks and disk, each of said masks having a trapezoidal sector with a plurality of trapezoidal windows formed therein and spaced apart by circumferential strips radially of the mask, said windows respectively exposing one of the first, second, third and fourth sections of a trapezoidal sector of a side of the disk in each of a plurality of positions of each mask as the mask is rotated around the disk.

2. A device for coordinating furniture styles with color schemes, fabrics, accessories and related data, comprising a flat circular disk, each side of said disk having an annular peripheral band divided into arcuate differently colored ribbons, a first trapezoidal section located radially inward of each adjacent pair of said ribbons for bearing data relating to a particular furniture style and period, a second trapezoidal section located radially inward of the first section for bearing pictorial data and material composition data relating to said furniture style and period, a third trapezoidal section located radially inward of the second section bearing data relating to fabrics characteristic of said furniture style and period, a fourth trapezoidal section located radially inward of said third section and terminating near the center of said disk, said fourth section bearing data related to accessories characteristic of said furniture style and period, part of said fourth section being colored to coordinate with the colors of said pair of ribbons to indicate a room color scheme appropriate to said furniture style and period; a pair of circular masks mounted on opposite sides of said disk concentric therewith, pivot means rotatably securing the masks to the disk at the registering centers of the masks and disk, each of said masks having a trapezoidal sector with a plurality of trapezoidal windows formed therein and spaced apart by circumferential strips radially of the mask, said windows respectively exposing one of the first, second, third and fourth sections of a trapezoidal sector of a side of the disk in each of a plurality of positions of each mask as the mask is rotated around the disk, a rectangular cover folded transversely at its center and a rectangular sheet secured inside said cover at its fold and protected by said cover, said disk being integrally formed with said sheet.

3. A device for coordinating furniture styles with color schemes, fabrics, accessories and related data, comprising a flat circular disk, each side of said disk having an annular peripheral band divided into arcuate differently colored ribbons, a first trapezoidal section located radially inward of each adjacent pair of said ribbons for bearing data relating to a particular furniture style and period, a second trapezoidal section located radially inward of the first section for bearing pictorial data and material composition data relating to said furniture style and period, a third trapezoidal section located radially inward of the second section bearing data relating to fabrics characteristic of said furniture style and period, a fourth trapezoidal section located radially inward of said third section and terminating near the center of said disk, said fourth section bearing data related to accessories characteristic of said furniture style and period, part of said fourth section being colored to coordinate with the colors of said pair of ribbons to indicate a room color scheme appropriate to said furniture style and period; a pair of circular masks mounted on opposite sides of said disk concentric therewith, pivot means rotatably securing the masks to the disk at the registering centers of the masks and disk, each of said masks having a trapezoidal sector with a plurality of trapezoidal windows formed therein and spaced apart by circumferential strips radially of the mask, said windows respectively exposing one of the first, second, third and fourth sections of a trapezoidal sector of a side of the disk in each of a plurality of positions of each mask as the mask is rotated around the disk, a rectangular cover folded transversely at its center, a rectangular sheet secured inside said cover, said disk being integrally formed with said sheet and being readily separable therefrom by a circular scored line extending around the periphery of said disk, whereby said cover protects and covers said disk and masks when the cover is closed.

4. A device for coordinating furniture styles with color schemes, fabrics, accessories and related data, comprising a flat circular disk, said disk having an annular peripheral band divided into arcuate differently colored ribbons, said disk having a plurality of trapezoidal sectors adjacent each other all around the disk defined by a plurality of radially spaced trapezoidal apertures in each sector and by a pair of said ribbons, a plurality of groups of trapezoidal tabs, each group of said tabs being removably engaged in the apertures of one of the sectors, the tabs in each of said sectors bearing on opposite sides pictorial, colored and descriptive data thereon relating to particular furniture styles and periods, and a circular mask mounted on one side of said disk concentric therewith, pivot means rotatably securing the mask to the disk at the registering center of the mask and disk, said mask having a trapezoidal sector with a plurality of trapezoidal windows formed therein and spaced apart radially of the mask, said windows respectively exposing one side of a different group of said tabs in each of a plurality of positions of the mask as the mask is rotated around the disk.

5. A device for coordinating furniture styles with color schemes, fabrics, accessories and related data, comprising a flat circuit disk, said disk having an annular peripheral band divided into arcuate differently colored ribbons, said disk having a plurality of trapezoidal sectors adjacent each other all around the disk defined by a plurality of radially spaced trapezoidal apertures in each sector and by a pair of said ribbons, a plurality of groups of trapezoidal tabs, each group of said tabs being removably engaged in the apertures of one of the sectors, the tabs in each of said sectors bearing on opposite sides pictorial, colored and descriptive data thereon relating to particular furniture styles and periods, a circular mask mounted on one side of said disk concentric therewith, pivot means rotatably securing the mask to the disk at the registering center of the mask and disk, said mask having a trapezoidal sector with a plurality of trapezoidal windows formed therein and spaced apart radially of the mask, said windows respectively exposing one side of a different group of said tabs in each of a plurality of positions of the mask as the mask is rotated around the disk, and another circular mask mounted on the other side of said disk and rotatably secured by said pivot means to the disk at the registering center of the other mask and disk, said other mask having a trapezoidal section with a plurality of other trapezoidal windows formed therein and spaced apart radially of the other mask, said other windows respectively exposing the other side of a different group of said tabs in each of a plurality of positions of the other mask as the other mask is rotated around the disk.

6. A device for coordinating furniture styles with color schemes, fabrics, accessories and related data, comprising a flat circular disk, each side of said disk having an annular peripheral band divided into arcuate differently colored ribbons, a first trapezoidal section located radially inward of each adjacent pair of said ribbons for bearing data relating to a particular furniture style and period, a second trapezoidal section located radially inward of the first section for bearing pictorial data and material composition data relating to said furniture style and period, a third trapezoidal section located radially inward of the second section bearing data relating to fabrics characteristic of said furniture style and period, a fourth trapezoidal section located radially inward of said third section and terminating near the center of said disk, said fourth section bearing data related to accessories characteristic of said furniture style and period, part of said fourth section being colored to coordinate with the colors of said pair of ribbons to indicate a room color scheme appropriate to said furniture style and period, a circular mask mounted on one side of said disk concentric therewith, pivot means rotatably securing the mask to the disk at the registering center of the mask and disk, said mask having a trapezoidal sector with a plurality of trapezoidal windows spaced apart by circumferential strips radially of the mask, said windows respectively exposing one of the first, second, third and fourth sections of a trapezoidal sector of the one side of the disk in each of a plurality of positions of the mask as the mask is rotated around the disk.

7. A device for coordinating furniture styles with color schemes, fabrics, accessories and related data, comprising a flat circular disk, each side of said disk having an annular peripheral band divided into arcuate differently colored ribbons, a first trapezoidal section located radially inward of each adjacent pair of said ribbons for bearing data relating to a particular furniture style and period, a second trapezoidal section located radially inward of the first section for bearing pictorial data and material composition data relating to said furniture style and period, a third trapezoidal section located radially inward of the second section bearing data relating to fabrics characteristic of said furniture style and period, a fourth trapezoidal section located radially inward of said third section and terminating near the center of said disk, said fourth section bearing data related to accessories characteristic of said furniture style and period, part of said fourth section being colored to coordinate with the colors of said pair of ribbons to indicate a room color scheme appropriate to said furniture style and period, a circular mask mounted on one side of said disk concentric therewith, pivot means rotatably securing the mask to the disk at the registering center of the mask and disk, said mask having a trapezoidal sector with a plurality of trapezoidal windows spaced apart by circumferential strips radially of the mask, said windows respectively exposing one of the first, second, third and fourth sections of a trapezoidal sector of the one side of the disk in each of a plurality of positions of the mask as the mask is rotated around the disk, a rectangular cover folded transversely at its center and a rectangular sheet secured inside said cover at its fold and protected by said cover, said disk being integrally formed with said sheet.

8. A device for coordinating furniture styles with color schemes, fabrics, accessories and related data, comprising a flat circular disk, each side of said disk having an annular peripheral band divided into arcuate differently colored ribbons, a first trapezoidal section located radially inward of each adjacent pair of said ribbons for bearing data relating to a particular furniture style and period, a second trapezoidal section located radially inward of the first section for bearing pictorial data and material composition data relating to said furniture style and period, a third trapezoidal section located radially inward of the second section bearing data relating to fabrics characteristic of said furniture style and period, a fourth trapezoidal section located radially inward of said third section and terminating near the center of said disk, said fourth section bearing data related to accessories characteristic of said furniture style and period, part of said fourth section being colored to coordinate with the colors of said pair of ribbons to indicate a room color scheme appropriate to said furniture style and period, a circular mask mounted on one side of said disk concentric therewith, pivot means rotatably securing the mask to the disk at the registering center of the mask and disk, said mask having a trapezoidal sector with a plurality of trapezoidal windows spaced apart by circumferential strips radially of the mask, said windows respectively exposing one of the first, second, third and fourth sections of a trapezoidal sector of the one side of the disk in each of a plurality of positions of the mask as the mask is rotated around the disk, a rectangular cover folded transversely at its center, a rectangular sheet secured inside said cover, said disk being integrally formed with said sheet and being readily separable therefrom by a circular scored line extending around the periphery of said disk, whereby said cover protects and covers said disk and mask when the cover is closed.

9. A device for coordinating furniture styles with color schemes, fabrics, accessories and related data, comprising a flat circular disk, said disk having an annular peripheral band divided into arcuate differently colored ribbons, said disk having a plurality of trapezoidal sectors adjacent each other all around the disk defined by a plurality of radially spaced trapezoidal apertures in each sector and by a pair of said ribbons, a plurality of groups of trapezoidal tabs, each group of said tabs being removably engaged in the apertures of one of the sectors, the tabs in each of said sectors bearing on opposite sides pictorial, colored and descriptive data thereon relating to particular furniture styles and periods, and a circular mask mounted on one side of said disk concentric therewith, pivot means rotatably securing the mask to the disk at the registering center of the mask and disk, said mask having a trapezoidal sector with a plurality of trapezoidal windows formed therein and spaced apart radially of the mask, said windows respectively exposing one side of a different group of said tabs in each of a plurality of positions of the mask as the mask is rotated around the disk, a rectangular cover folded transversely at its center and a rectangular sheet secured inside said cover at its fold and protected by said cover, said disk being integrally formed with said sheet.

10. A device for coordinating furniture styles with color schemes, fabrics, accessories and related data, comprising a flat circular disk, said disk having an annular peripheral band divided into arcuate differently colored ribbons, said disk having a plurality of trapezoidal sectors adjacent each other all around the disk defined by a plurality of radially spaced trapezoidal apertures in each sector and by a pair of said ribbons, a plurality of groups of trapezoidal tabs, each group of said tabs being removably engaged in the apertures of one of the sectors, the tabs in each of said sectors bearing on opposite sides pictorial, colored and descriptive data thereon relating to particular furniture styles and periods, a circular mask mounted on one side of said disk concentric therewith, pivot means rotatably securing the mask to the disk at the registering center of the mask and disk, said mask having a trapezoidal sector with a plurality of trapezoidal windows formed therein and spaced apart radially of the mask, said windows respectively exposing one side of a different group of said tabs in each of a plurality of positions of the mask as the mask is rotated around the disk, and another circular mask mounted on the other side of said disk and rotatably secured by said pivot means to the disk at the registering center of the other mask and disk, said other mask having a trapezoidal section with a plurality of other trapezoidal windows formed therein and spaced apart radially of the other mask, said other windows respectively exposing the other side of a different group of said tabs in each of a plurality of positions of the other mask as the other mask is rotated around the disk, a rectangular cover folded transversely at its center, a rectangular sheet secured inside said cover, said disk being integrally formed with said sheet and being readily separable therefrom by a circular scored line extending around the periphery of said disk, whereby said cover protects and covers said disk and masks when the cover is closed.

References Cited by the Examiner

UNITED STATES PATENTS

| | | | |
|---|---|---|---|
| 1,762,036 | 6/1930 | Steedle | 35—28.3 |
| 1,989,353 | 1/1935 | Davis | 35—74 X |
| 2,234,609 | 3/1941 | Rowe | 35—53 |

FOREIGN PATENTS

| | | |
|---|---|---|
| 204,808 | 8/1959 | Austria. |

EUGENE R. CAPOZIO, *Primary Examiner.*